J. R. BAKER.
Car-Axle Box.
No. 213,731. Patented April 1, 1879.
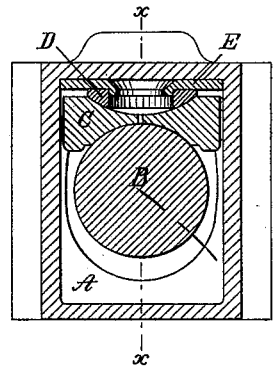

UNITED STATES PATENT OFFICE.

JACKSON R. BAKER, OF JERSEY CITY, N. J., ASSIGNOR OF TWO-THIRDS HIS RIGHT TO JACOB L. KENNEDY AND ELIOT LORD, OF NEW YORK, N. Y.

IMPROVEMENT IN CAR-AXLE BOXES.

Specification forming part of Letters Patent No. 213,731, dated April 1, 1879; application filed July 6, 1878.

*To all whom it may concern:*

Be it known that I, JACKSON R. BAKER, of Jersey City, in the State of New Jersey, have invented new and useful Improvements in Bearings for Journals and Shafting, of which the following is a specification:

My improvements, hereinafter described, relate more particularly to the saddles or bearings for railroad-car journals; and consist in providing the journal-bearing block or saddle with a compound sectional pivot-bearing between it and the roof or top of the housing or journal-box, to assist in giving the required amount of play in all necessary directions, to lessen the extra friction on certain portions of the journals consequent upon passing curvatures and other irregularities in railroad-tracks, by keeping the saddle or bearing always in line with the journal or axle, thereby preventing jamming or binding of the journal in the bearing.

In the drawings, Figure 1 is a longitudinal sectional view of the housing for the journals through the line *x x*. Fig. 2 is a section of the journals, and also of the saddle or bearing blocks, on line *y y*. Fig. 3 is a horizontal longitudinal section through the lines *z z* of Fig. 1, showing the upper portion of the saddle or bearing block, ring-socket, and journal. Fig. 4 is the top or bearing plate between the saddle or bearing block and the roof of the housing, showing a circular opening through it, with an oil-cup and a channel from the same to the opening. Fig. 5 is a longitudinal sectional view of the same, showing a stopping-shoulder and a pivot-boss.

The shoulder is formed across the forward end of the plate, substantially as shown by the dotted lines in Fig. 4. It office is to prevent the saddle or bearing block from displacement longitudinally, and to control its lateral movement or degree of oscillation. The pivot-boss *e* forms a portion of the upper bearing of the ring D, and extends far enough down into it to keep the ring in place and control its operation, allowing to it a circular motion, and centralizes the bearing of the saddle.

Fig. 6 is a top view of the saddle or bearing block, showing the location of the socket *c*, the dotted lines showing its swinging motion. Fig. 7 is a longitudinal sectional view of the same through the dotted line *v v* of Fig. 6, and Fig. 8 is a cross-section of the same. Fig. 9 is a top view of the socket-ring, and Fig. 10 is an elevation of the same.

The saddle or bearing block is made of any suitable metal, and differing from those heretofore in use, first, in its longitudinal direction, by forming it broad enough at its center to closely fit within the sides of the housing, then tapering to both ends on both sides in partially-curved lines, so as to allow a regular slight lateral swinging or oscillating movement; second, in the center of the top is countersunk a circular socket, *c*, in a dished form, its side walls from top to bottom constituting substantially a hemispherical section or a segment of the interior of a hollow ball. Into this socket is placed the plano-convex metallic ring D, fitted so as to work easily in the socket *c*.

The top or bearing plate E is also constructed of suitable metal, and should fit closely into the roof of the housing, and be secured there in its proper position. It extends beyond the forward end of the saddle or bearing block C, and has a shoulder or stop, *h*, extending downward and in front of the saddle or bearing block, as shown in Figs. 4 and 5, to prevent the saddle or bearing block from displacement outward. It is also thicker at the point where the pivot-boss *e* is attached than at the ends, (except at the shoulder projection,) being convex or beveled at its under side in each direction in slightly-curved lines, so as to allow a free rocking motion to the saddle or bearing block.

While the application of the whole of the foregoing arrangement will give the best results, I do not wish to be understood as limiting myself to it, as the saddle or bearing block may be secured to the plate E or to the roof of the housing by any of the well-known swiveling devices, to allow a horizontal oscillation.

It will readily be seen that this bearing-plate, when in position, forms substantially the roof of the housing, and becomes a necessity only where my improvements are applied to housings as now constructed. It may be dispensed with by constructing the top plate or roof of the housing in a suitable manner, and securing the pivot-bearing boss in proper position to that, and the top of the saddle or bearing block may be beveled, so as to answer the purpose described in beveling the bearing-plate.

What I claim as my invention, and desire to secure by Letters Patent, is—

In combination with the housing or box A, the saddle or bearing block C, pivot-boss $e$, socket $c$, and plano-convex ring D, all formed, arranged, and operating substantially as and for the purpose specified.

JACKSON R. BAKER.

Witnesses:
ELIOT LORD,
THOMAS VAN ANTWERP,
ANDREW VAN ANTWERP.